United States Patent [19]

Linne

[11] Patent Number: 4,469,336
[45] Date of Patent: Sep. 4, 1984

[54] TRACK PIN SEAL

[75] Inventor: Terry D. Linne, Peoria, Ill.

[73] Assignee: Caterpillar Tractor Co., Peoria, Ill.

[21] Appl. No.: 65,027

[22] Filed: Aug. 9, 1979

Related U.S. Application Data

[63] Continuation of Ser. No. 846,006, Oct. 27, 1977, abandoned, which is a continuation-in-part of Ser. No. 667,769, Mar. 17, 1976, Pat. No. 4,066,269.

[51] Int. Cl.³ .......................... F16J 15/32; F16J 15/34
[52] U.S. Cl. ......................................... 277/92; 305/11
[58] Field of Search ................. 277/81 R, 91, 92, 205; 305/9, 11

[56] References Cited

U.S. PATENT DOCUMENTS

| | | | |
|---|---|---|---|
| 2,487,669 | 11/1949 | Pattullo et al. | |
| 3,069,287 | 12/1962 | Hudson | |
| 3,200,615 | 8/1965 | Stokely | |
| 3,437,385 | 4/1969 | Deli | 277/92 |
| 3,601,419 | 8/1971 | Fern | 277/205 |
| 3,657,057 | 4/1972 | Shorr et al. | |
| 3,848,881 | 11/1974 | Ginn | |
| 3,913,924 | 10/1975 | Barefoot | |
| 4,026,563 | 5/1977 | Bainard | |
| 4,066,269 | 1/1978 | Linne | |

OTHER PUBLICATIONS

A Processing Handbook for TEXIN ® Urethane Elastoplastic Materials.
Dual-Material Molding of Radial Lip-Type Oil Seals, Caterpillar Tractor Co. Research Lab., Dec. 3, 1970.

Primary Examiner—Robert I. Smith
Attorney, Agent, or Firm—Charles E. Lanchantin, Jr.

[57] ABSTRACT

A unitary seal comprises an annular support section formed of a rigid polycarbonate plastic and an annular sealing section formed of a flexible polyurethane elastomer. The support and sealing sections are directly bonded together without the use of an adhesive therebetween to form a unitary seal. The sealing section has an annular lip extending from one side of the support section and adapted for sealing engagement with a member.

3 Claims, 2 Drawing Figures

TRACK PIN SEAL

CROSS REFERENCE TO RELATED APPLICATION

This application is a continuation of U.S. patent application Ser. No. 846,006, filed on Oct. 27, 1977, and now abandoned which is a continuation-in-part of U.S. patent application Ser. No. 667,769, filed on Mar. 17, 1976 by Terry D. Linne for "Dual-Material Self-Bonding Lip Seal" and now U.S. Pat. No. 4,066,269.

BACKGROUND OF THE INVENTION

1. Field of the Invention

The invention is concerned with a unitary seal adapted for use in an articulated joint and formed of two distinct materials having different properties, said materials being directly bonded together without the use of an adhesive between them.

2. Prior Art

A standard track pin seal normally comprises a one-piece elastomeric sealing member which is reinforced by a backing member to provide support therefor. Composite seals of this type present a number of problems. First, the seals are not of unitary construction and the parts thereof can be dislodged relative to one another. This problem is particularly apparent when the seal is employed in heavy-duty construction equipment.

The adhesive securance of the backing member to the sealing member does not adequately solve such a problem because the adhesive used may not exhibit sufficient cohesive strength, formation of the composite seal requires careful positioning of the parts together to avoid misalignment, and/or the adhesive might not be completely uniformly spread between the two parts of the seal whereby leakage could occur in the non-adhered portion of the seal.

The present invention provides a unitary seal wherein support and sealing sections thereof are directly bonded together without the use of an adhesive. This provides a unitary seal of great toughness which can be used in rough environments, such as in an articulated joint of an endless track assembly of a track-type vehicle.

SUMMARY OF THE INVENTION

This invention is drawn to a highly durable and efficient unitary seal comprising an annular support section formed of a high modulus, i.e., rigid, polycarbonate plastic and an annular sealing section formed of a flexible polyurethane elastomer, the support and sealing sections being directly bonded together without the use of an adhesive therebetween. The sealing section is at least substantially disposed on one side of the support section and has an annular lip extending axially therefrom for engaging a member in sealing contact therewith. The seal is particularly useful in an articulated joint employed in an endless track assembly of a track-type vehicle.

BRIEF DESCRIPTION OF THE DRAWINGS

The invention will be better understood by reference to the figures of the drawings wherein like numbers denote like parts throughout and wherein.

DETAILED DESCRIPTION

Figure 1:
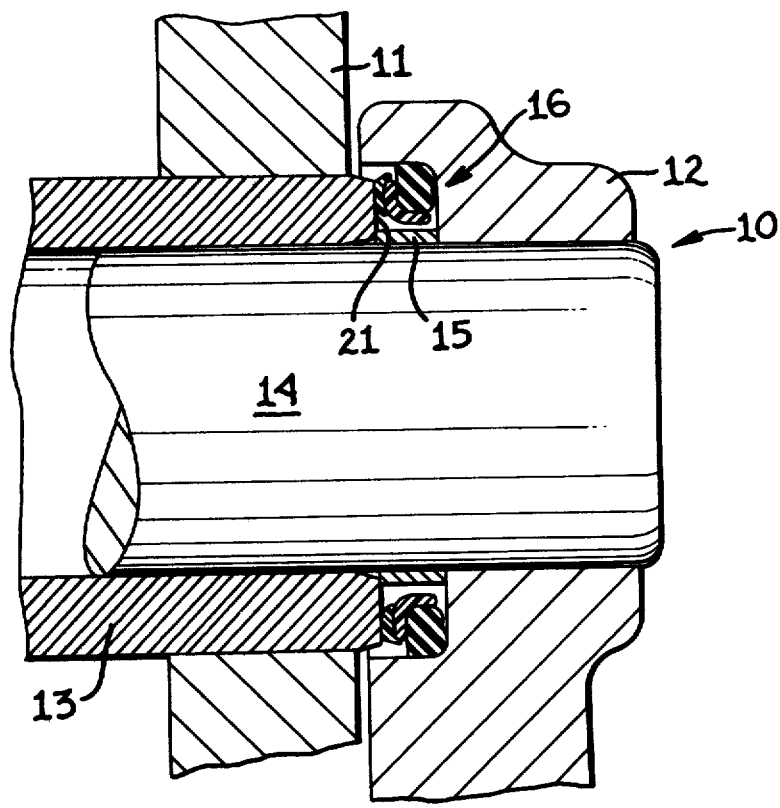
FIG. 1 is a sectional view illustrating an articulated joint of an endless track assembly having the seal of this invention mounted therein.

FIG. 1 illustrates an articulated joint 10 for use in an endless track assembly of a track-type vehicle, such as a tractor. The articulated joint comprises a plurality of pivotally interconnected first and second track links 11 and 12, respectively. The articulated joint further comprises a cylindrical bushing 13 secured to link 11 and a pin 14 secured to link 12 in a conventional manner. A metallic spacer ring 15 is encirclingly slip-fitted over the pin and is disposed between link 12 and bushing 13. For purposes herein, link 11 and bushing 13 may be considered a "first member" and link 12, pin 14 and ring 15 may be considered a "second member" pivotally connected to the first member.

A unitary seal 16 of this invention is disposed within a counterbore defined on an inboard side of link 12 of the second member and circumvents ring 15. As more clearly shown in FIG. 2, the seal comprises an annular support section 17 and an annular sealing section 18 at least substantially disposed on an axial side of the support section. An annular elastomeric load ring 19 is disposed within the counterbore defined on link 12 to urge the seal into sealing contact with bushing 13 of the first member.

In particular, sealing section 18 has an annular sealing lip 20 formed thereon to extend axially therefrom to engage a sealing surface 21, defined on an outer end of bushing 13, in intimate sealing contact. It should be noted that support section 17 has an L-shaped cross section to comprise a cylindrical portion 22 circumventing and spaced radially outwardly from ring 15 and a radial portion 23. Sealing section 18 is generally wedge-shaped in cross section and is mainly secured exteriorly on radial portion 23 of the support section. The sealing section may further comprise inner and outer portions 24 and 25, respectively, secured to inner and outer sides of the support section.

Support section 17 is composed of a rigid high modulus plastic material whereas sealing section 18 is composed of a flexible elastomeric material. The two sections are directly bonded together along a surface, defined by line 26. The sections are thus bonded together without the aid of an adhesive therebetween to form the unitary seal.

Rigid support section 17 is formed of a polycarbonate plastic. While any polycarbonate plastic or polycarbonate resin may be used in the preferred embodiment of the invention, the commercial variety of this resin is generally produced from phosgene and bisphenol A. This preferred commercial variety of the resin has the structure $(-COOC_6H_5C(CH_3)_2C_6H_5O-)_n$ where $n$ represents the average number of units of the above structure in a particular polycarbonate resin. More generally, a polycarbonate resin is formed from any dihydroxy compound and any carbonate diester, or any ester interchange. Such a resin is noncorrosive, nontoxic, resistant to chemicals and weather, and stain resistant. The resin also has a low rate of water absorption, high modulus, high impact strength, good heat resistance and dimensional stability (rigidity). A description of polycarbonate resins, useful in the practice of the present invention, may be found, for example, in the 1975-76 Modern Plastics Encyclopedia on pages 54 and 56.

Preferably, the polycarbonate resin is glass-filled as by including glass fibers therein. The amount of glass fibers in the polycarbonate plastic can vary considerably and will generally fall within a range from about 5 to about 75 weight percent of the total polycarbonate plastic plus glass fiber weight. More preferably, the polycarbonate plastic is filled with from about 10 to about 60 weight percent of glass fibers based on the total weight of polycarbonate and glass fibers. More preferably still, the amount of glass fiber will fall within the range from about 20 weight percent to about 40 weight percent. It will be noted that polycarbonate resins have quite high impact strength and rigidity (high modulus). This is quite important in the present application wherein the polycarbonate resin is used as a support section for the unitary seal 16 of the present invention. Other filler materials, e.g., carbon black, graphite fibers, glass beads, mica or other mineral fillers, polyaramid fibers or the like, may be added to the polycarbonate plastic to increase opaqueness, reduce costs of support section 17 and/or introduce other properties thereto.

Flexible sealing section 18 preferably comprises a polyurethane elastomer. The basic polymer unit of a polyurethane resin is formed as shown in the following equation: $R_1NCO + R_2OH = NHCOOR_2$ wherein $R_1$ and $R_2$ comprise organic groups which may include hydroxyl groups as a part thereof. If $R_1$ has an additional NCO group and $R_2$ has a second OH group, chain growth can occur. Cross linking can take place if $R_2$ has three or more OH groups. Polyurethane resins are often made through use of toluene diisocyanate. Often an 80:20 mixture of the 2,4- and 2,6-isomers are used. Diphenylmethane-4,4'-diisocyanate is also a widely used diisocyanate for forming polyurethane resins. The hydroxyl groups which are incorporated into the resins often come from polyester glycols, especially polyethelene adipate glycol. A detailed description of the polyurethane elastomers which are useful in the formation of unitary seals in the present invention may be found in the 1975-76 Modern Plastics Encyclopedia at pages 84 and 85 thereof.

It has been unexpectedly found that when the support section 17 is composed of a rigid polycarbonate plastic and the flexible sealing section 18 is composed of a polyurethane elastomer, that one can obtain a direct bonding together of these structures without the use of an adhesive therebetween whereby a unitary seal is formed which is strong enough to withstand the stresses to which such a seal is exposed. The production of a direct bond of such strength is quite unexpected because of the different structures of the polymers which are bonded together. It has been found that this bonding together can be carried out under only the influence of heat and sufficient pressure to assure a pressed contact between the polycarbonate support section and the flexible sealing section.

Seal 16 may be formed in substantial accordance with the teachings and method steps disclosed in above-referenced U.S. patent application Ser. No. 667,769, now U.S. Pat. No. 4,066,269, the full scope and subject matter of which is incorporated herein by reference.

Figure 2:
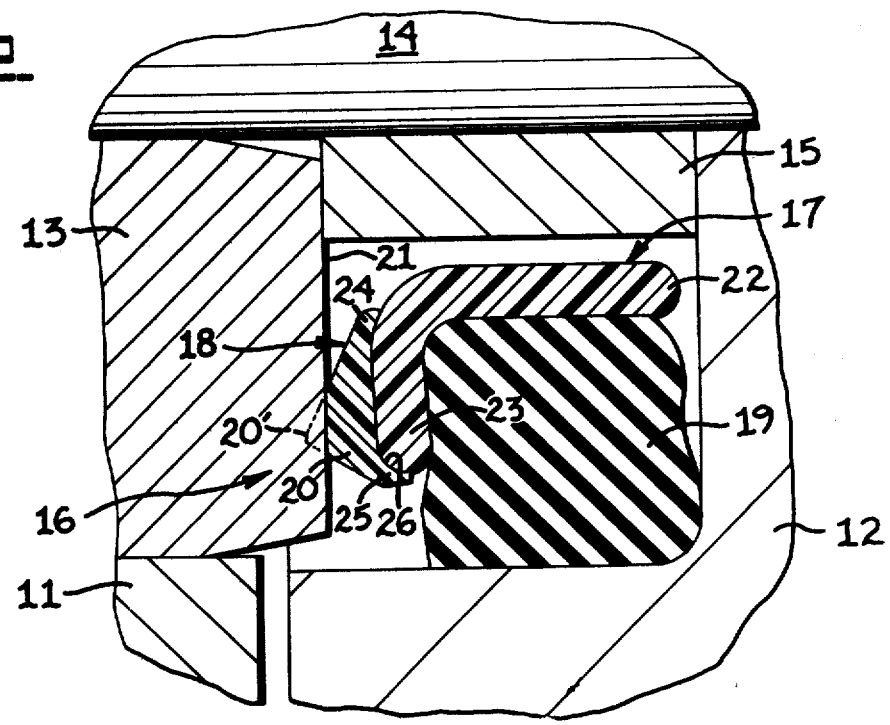
FIG. 2 is an enlarged sectional view of the seal mounted in the articulated joint.

The pre-installed and expanded condition of sealing lip 20 is illustrated at 20' in FIG. 2. Upon installation, the lip is comprised in an axial direction to assume the generally flattened sealing condition illustrated by full lines. In operation and upon relative pivotal movements of track links 11 and 12, load ring 19 will function to continuously impose an axial force against radial portion 23 of support section 17 to maintain lip 20 in intimate sealing contact with sealing surface 21 and to stabilize the lip to provide sealing capabilities over a substantial range of seal travel.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. A unitary seal (16) connected between two relatively rotatable members (12,13) comprising:
   an annular support section (17) having an annular radially outwardly extending portion (23) and being formed of a high modulus rigid polycarbonate plastic; and
   an annular sealing section (18) formed of a flexible polyurethane elastomer, the support section (17) and the sealing section (18) being directly bonded together without the use of an adhesive therebetween, and the sealing section (18) being at least substantially disposed on one side of the support section (17) and having an annular lip (20) extending from the one side and generally axially away from the radially outwardly extending portion (23), the lip (20) being adapted for sealing engagement with one of the members (12,13).

2. The unitary seal (16) of claim 1 wherein the polycarbonate plastic of the support section (17) is filled from about 5 to about 75 weight percent of inert filler materials based upon the total weight of the polycarbonate plastic and the inert filler materials.

3. The unitary seal (16) of claim 1 wherein the polycarbonate plastic of the support section (17) is filled from about 10 to about 60 weight percent of glass fibers based upon the total weight of the polycarbonate plastic and the glass fibers.

* * * * *